United States Patent
Huang et al.

(10) Patent No.: US 10,834,671 B2
(45) Date of Patent: Nov. 10, 2020

(54) GROUP IDENTIFICATION INDICATION SIGNALING

(71) Applicant: Intel IP Corporation, Santa Clara, CA (US)

(72) Inventors: Po-Kai Huang, San Jose, CA (US); Daniel Bravo, Portland, OR (US); Noam Ginsburg, Portland, OR (US); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 31 days.

(21) Appl. No.: 16/198,436

(22) Filed: Nov. 21, 2018

(65) Prior Publication Data

US 2019/0098574 A1 Mar. 28, 2019

Related U.S. Application Data

(60) Provisional application No. 62/609,977, filed on Dec. 22, 2017.

(51) Int. Cl.
*H04W 52/02* (2009.01)
*H04W 4/06* (2009.01)

(52) U.S. Cl.
CPC ......... *H04W 52/0219* (2013.01); *H04W 4/06* (2013.01); *H04W 52/0229* (2013.01)

(58) Field of Classification Search
None
See application file for complete search history.

(56) References Cited

U.S. PATENT DOCUMENTS

| | | | |
|---|---|---|---|
| 2015/0288427 A1* | 10/2015 | Wang | H04W 72/1284 370/329 |
| 2015/0365885 A1* | 12/2015 | Yang | H04W 72/042 370/312 |
| 2016/0165574 A1* | 6/2016 | Chu | H04L 27/2602 370/312 |
| 2017/0223665 A1* | 8/2017 | Chun | H04L 27/26 |
| 2019/0052353 A1* | 2/2019 | Kim | H04B 7/0452 |
| 2019/0261273 A1* | 8/2019 | Kim | H04W 76/11 |

* cited by examiner

*Primary Examiner* — Eunsook Choi
(74) *Attorney, Agent, or Firm* — Eversheds Sutherland (US) LLP

(57) ABSTRACT

This disclosure describes methods, apparatuses, and wireless stations related to waking up low power radios. In particular, a wireless station is disclosed that may identify a first management frame from a first wireless station a first management frame from a first wireless station. The wireless station may cause to allocate one or more group identifications (IDs) to the first wireless station. The wireless station may cause to generate a bitmap corresponding to the allocation of the one or more group IDs to the first wireless station. The wireless station may cause to send a second management frame to the first wireless station of one or more wireless stations, wherein the second management frame comprises the bitmap.

9 Claims, 12 Drawing Sheets

US 10,834,671 B2

GROUP IDENTIFICATION INDICATION SIGNALING

CROSS-REFERNECE TO RELATED APPLICATIONS

This application claims the benefit of U.S. Provisional Application No. 62/609,977, filed Dec. 22, 2017, the disclosure of which is incorporated herein by reference as set forth in full.

TECHNICAL FIELD

This disclosure generally relates to systems and methods for wireless communications and, more particularly, to group identification (ID) indication signaling.

BACKGROUND

Advances in wireless communications require the use of efficient batteries to allow users to utilize their devices for longer times between recharges or replacement. The exchange of data in wireless communications consumes power and having repeated recharges or installation of dedicated power lines may result in a relatively negative user experience.

DETAILED DESCRIPTION

Figure 1:
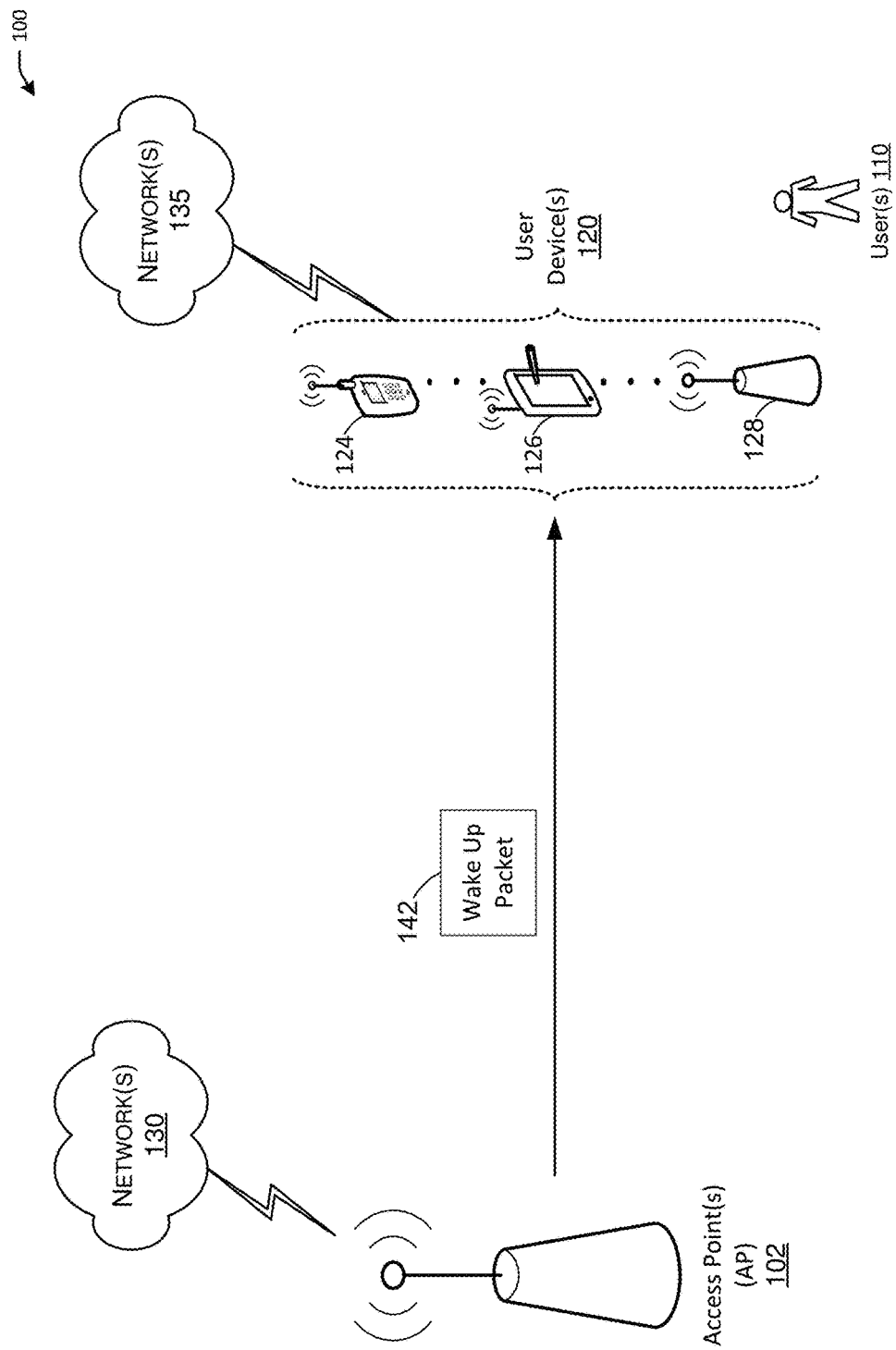
FIG. 1 depicts a network diagram illustrating an example network environment for group ID indication signaling, in accordance with one or more example embodiments of the present disclosure.

Example embodiments described herein provide certain systems, methods, and devices for multiband wake-up radio (WUR) using orthogonal frequency-division multiple access (OFDMA) for improved efficiency and enable socialization channel. The following description and the drawings sufficiently illustrate specific embodiments to enable those skilled in the art to practice them. Other embodiments may incorporate structural, logical, electrical, processes, and other changes. Portions and features of some embodiments may be included in, or substituted for, those of other embodiments. Embodiments set forth in the claims encompass all available equivalents of those claims.

Low Power Wake Up Receiver (LP-WURx) is a technique to enable ultra-low power operation for Wi-Fi devices. The idea is for a device to have a minimum radio configuration that can receive wake-up frames from peer devices. Hence, the devices can stay in low power mode until receiving a wake-up frame from a WUR transmitter. Generally, the transmitter will have a wake-up radio that implements transmitting and receiving operations. At the receiver side, a WUR receiver may implement receiving operations will be implemented, and due to this reason, it is called a wake-up receiver (WURx) at the receiver side.

The concept of a Low-Power Wake-Up Receiver (LP-WURx) was developed as a means to vastly improve the standby, sleep and in cases even active mode power consumption. The technology is being standardized within IEEE and there is currently a task group now under way named 802.11ba.

Due to insufficient number of bits for additional signaling in the medium access control (MAC) header of wake-up frames, group IDs may be used to signal to receiving stations (STAs) that when they receive a wake-up frame, they should send a signal to up the primary control radio (PCR) to power up. In addition, the group IDs may convey information indicating that authentication is, or is not, used with wake-up frames. The group IDs may also convey information indicating that group-addressed transmission is, or is not, used for the PCR. Because the current group ID fields are limited in the number of bits that are used to convey the assignment of receiving stations to different groups, as well as the additional information a new method is disclosed herein to more efficiently convey the assignment of group IDs and the additional information.

In some embodiments, a wireless station comprising a PCR and a LP-WURx, is disclosed that exchanges management frames with a receiving wireless station via the PCR that instructs the receiving station to turn on tis PCR when it receives a wake-up frame on its LP-WURx from the LP-WURx of the wireless station.

In some embodiments, the wake-up frame may comprise a plurality of fields, one of which may be used to indicate one or more values each of which designates a group ID. The group ID may be a field comprising one or more bits, which in aggregate may represent the value of a single group ID. IN other embodiments, each of the bits may represent a group ID based on their placement of the bits within the field. For example, each bit from left to right in the field may signal a group ID, and when the field has a value of 0 it may indicate that any wireless station receiving the wake-up frame should power on its LP-WURx.

In some embodiments, the group ID may also signal that the wake-up frame is being sent with authentication and/or group-addressed transmission for the PCRs in the wireless stations receiving the wake-up frame.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a network diagram illustrating an example network environment of low power wake-up signaling, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 10:
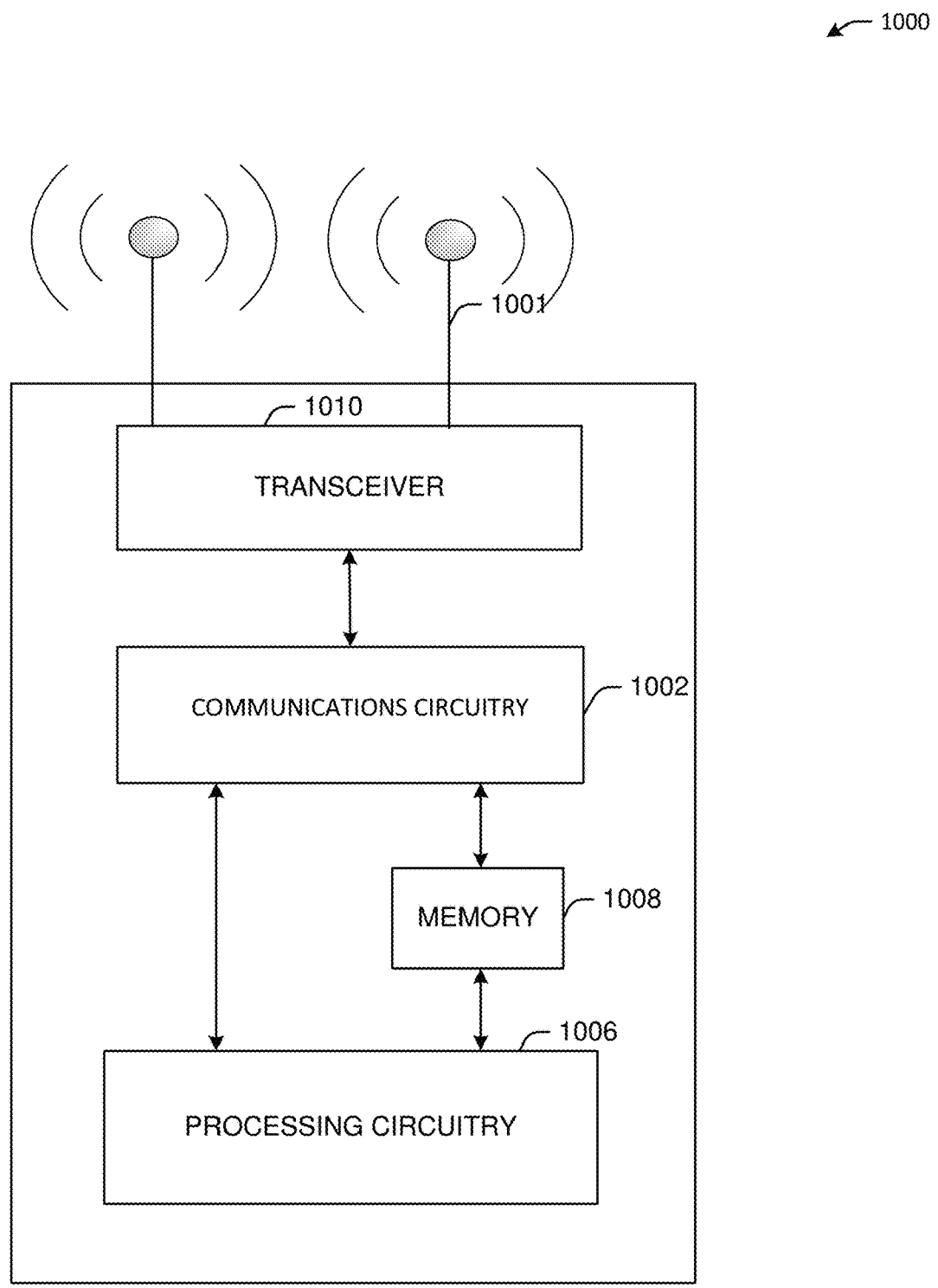
FIG. 10 depicts a functional diagram of an exemplary communication station that may be suitable for use as a user device, in accordance with one or more example embodiments of the present disclosure.
Figure 11:
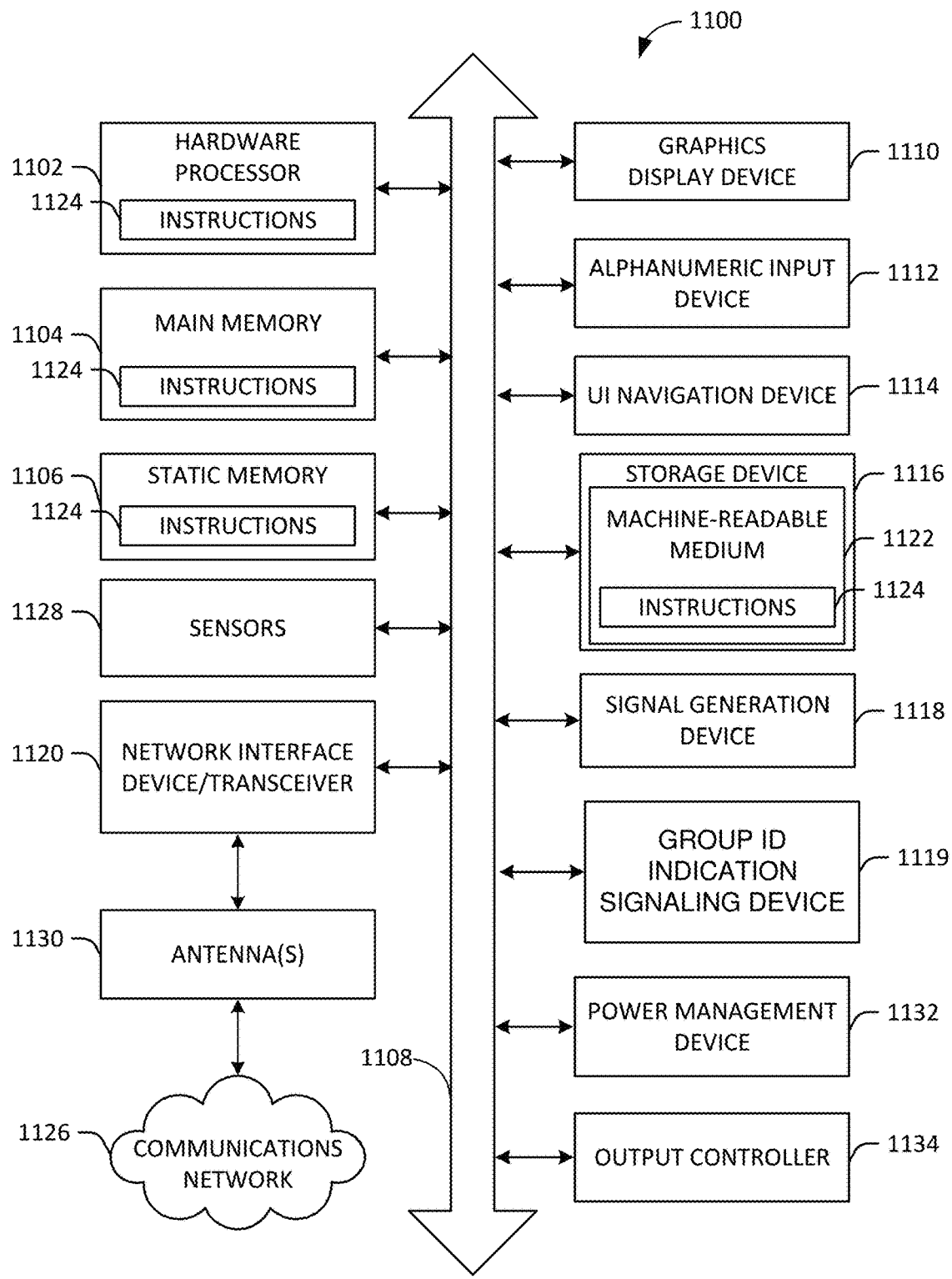
FIG. 11 depicts a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 10 and/or the example machine/system of FIG. 11.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The one or more user devices 120 may operate in a low power mode to conserve power. During this time, the LP-WUR of a user device 120 may be active while an 802.11 transceiver may be inactive. Because the LP-WUR may operate in a lower power state than the 802.11 transceiver, power may be conserved on the user device 120.

In one embodiment, an AP 102 may send one or more wake-up frames 142 to one or more user device(s) 120. A wake-up frame 142 may signal to a user device 120 to activate a higher power mode, which may include activating a higher-powered 802.11 transceiver on the user device 120.

Figure 2:
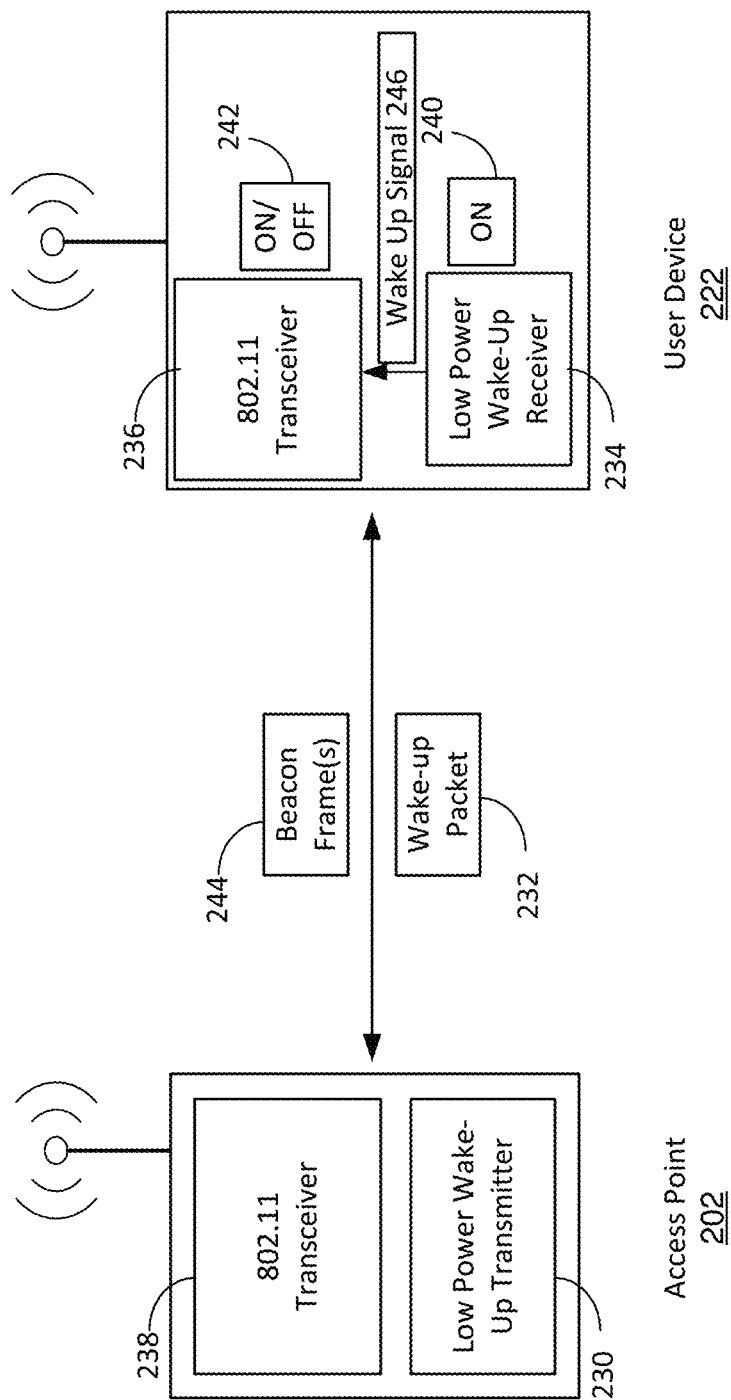
FIG. 2 depicts an illustrative schematic diagram for low power wake-up signaling, in accordance with one or more example embodiments of the present disclosure.

FIG. 2 depicts an illustrative schematic diagram for low power wake-up signaling, in accordance with one or more example embodiments of the present disclosure.

Referring to FIG. 2, there is shown a transmitting device (e.g., AP 202) and a receiving device (e.g., user device 222) involved in a transmission session utilizing low-power wake-up signaling. The AP 202 may utilize a low-power wake-up transmitter 230 to send a wake-up frame 232 to the low-power wake-up receiver (LP-WUR) 234 included in the user device 222.

An LP-WUR is a technique to enable ultra-low power operation for Wi-Fi device. The idea is for a device to have a minimum radio configuration that can receive wake up frame from the peer. Hence, the device can stay in low power mode until receiving the wake up frame. FIG. 2 shows an example of a unicast wake-up frame. It is also possible that a transmitter (e.g., an AP) may send a multicast wake-up frame to wake up more than one STA.

The LP-WUR 234 may use simple modulation schemes such as on-off keying (OOK), amplitude shift keying (ASK), or frequency shift keying (FSK) for signaling. The LP-WUR 234 may use hardware and/or software components that may allow it to operate at a lower power consumption mode than a typical radio component (e.g., 802.11 transceivers 236 and 238).

The LP-WUR 234 may be constantly active (e.g., ON state 240) on the user device 222 in order to receive a wake-up communication (e.g., the wake-up frame 232). The AP 202 may begin transmitting the wake-up frame 232 using a low-power communication method. The LP-WUR 234 may detect and/or decode the wake-up frame and may determine whether the wake-up frame is destined for the user device 222. If the LP-WUR 234 (or other portions of the user device 222) determines that the receiver address (RA) field of the MAC header from the wake-up frame 232 matches the address of the user device 222, the LP-WUR 434 may then send a wake-up signal 246 to the 802.11 transceiver 236 to power on (e.g., ON/OFF state 242) its circuitry.

The wake-up frame 232 may include timing information such as a wake-up period. The wake-up period may be a period of time that the user device 222 may need to have when devices, such as the AP 202, may be sending data to the user device 222. Following the wake-up period, the user device 222 may power off some or all of its circuitry to reduce power consumption and preserve the life of its battery.

The low-power wake-up transmitter 230 may be a device on the AP 202 that transmits a wake-up frame to other devices (e.g., the user device 222). The low-power wake-up transmitter 230 may transmit at the same simple modulation schemes of the user device 222 (e.g., OOK, ASK, FSK, etc.). The low-power wake-up transmitter 230 may utilize signaling in order to generate and transmit the wake-up frame 232. It should be noted that wake-up frame is the same as wake-up frame, both terms may be used interchangeably. In addition, it should be noted that, the term primary connectivity radio (PCR) may be used to refer to the 802.11 radio that is waked up by the WURx.

Figure 3:
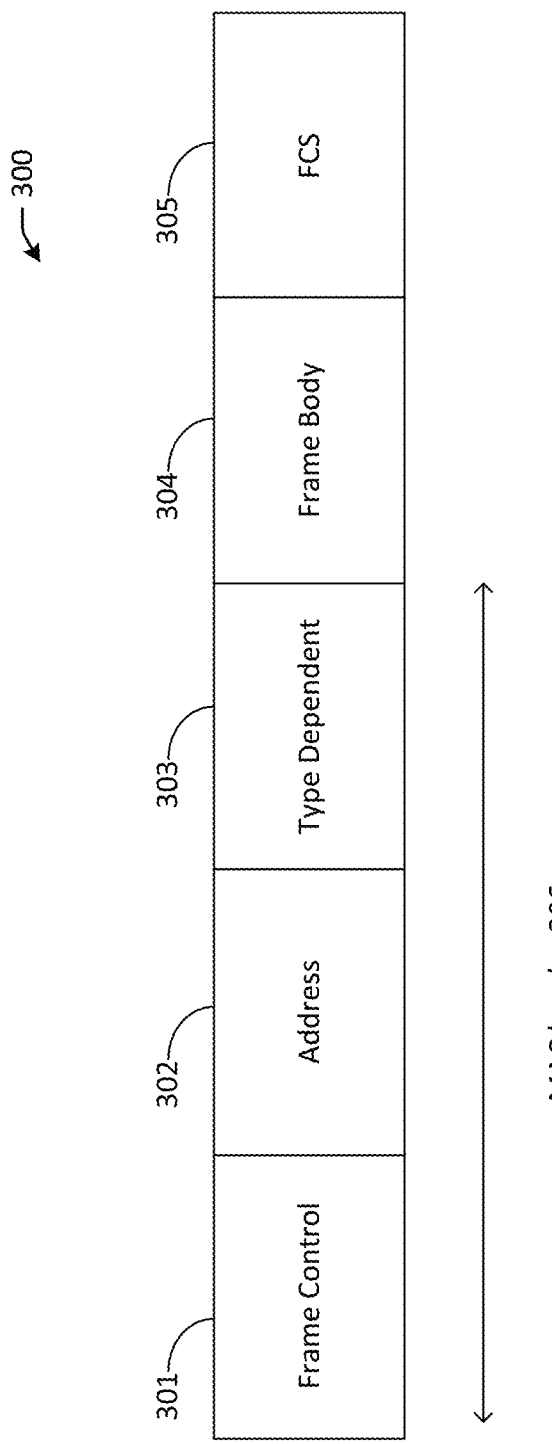
FIG. 3 depicts an illustrative schematic diagram for group ID indication signaling, in accordance with one or more example embodiments of the present disclosure.

FIG. 3 depicts an illustrative schematic diagram 300 for group ID indication signaling, in accordance with one or more example embodiments of the present disclosure. Wake-up frame 300 comprises a frame control field 301, address field 302, type dependent field 303, frame body field 304, and/or a frame check sequence (FCS) field 305. A MAC header 306, of wake-up frame 300, may comprise the frame control field, address field, and type dependent field. In some embodiments, there may be group ID signaling in the address field 302 of wake-up frame 300. The group ID signaling may be used to wake-up multiple stations simultaneously.

Frame control field 301 may comprise a type subfield, a length present subfield, length/miscellaneous subfield, and/or a protected subfield. The type subfield may indicate the type of wake-up frame 300 is a WUR frame of type wake-up. Address field 302 may comprise an identifier for the WUR frame. The identifier may indicate that wake-up frame 300 is addressed to a group of receiving stations (WUR receivers). A group ID identifies a group of one or more WUR receivers and is selected from a group ID space, obtained from an identifier's space. The station transmitting wake-up frame 300 (WUR transmitter) may ensure that the lowest group ID of the group ID space is randomly selected from the identifier's space. A WUR transmitter may assign one or more group IDs to a WUR receiver that has set a Supported Group IDs field of a WUR Capabilities element in a management frame to a nonzero value. The WUR receiver may indicate to the WUR transmitter that it has set the Supported Group IDs field to a nonzero value by transmitting a management frame to the WUR transmitter to indicate that it supports the ability to be assigned to more than one group.

As explained below, the WUR receiver may be limited to a maximum number of groups that it can be assigned to based on storage limits of the memory of the WUR receiver. For example, if the memory in the WUR receiver can only accommodate storage of ten group IDs, the WUR receiver may transmit a management frame, which can be a WUR action frame in some embodiments, to the WUR transceiver indicating that it can only be assigned to ten groups. Thus the maximum number of groups that the WUR receiver can belong to may be limited by the maximum number of group IDs that the memory in the WUR receiver can store. The maximum number of group IDs may transmitted in a WUR capability element. The WUR capability element may comprise a number of fields that may be used to advertise WUR capabilities of a WUR transmitter or a WUR receiver.

The WUR capability element may comprise an element ID field, length field, element ID extension field, supported bands field, and/or a WUR capabilities information field. The element ID field and element ID extension field may be a numerical value indicating the element type. For example, a WUR capability element may be indicated by an element ID field value of 255 and element ID extension field value of 48. Supported bands field may indicate the supported frequency bands for communication between the WUR transmitter and the WUR receiver. The WUR capabilities information field may comprise a group IDs support field. The group IDs support field indicates the group IDs that are supported. Group IDs support field may be set to zero, by the WUR receiver, to indicate that the maximum number that the WUR receiver can be assigned to is zero. The group IDs support field may be set to one, by the WUR receiver, to indicate that the maximum number that the WUR receiver can be assigned to is 16. The group IDs support field may be set to two, by the WUR receiver, to indicate that the maximum number that the WUR receiver can be assigned to is 32. The group IDs support field may be set to three, by the WUR receiver, to indicate that the maximum number that the WUR receiver can be assigned to is 64.

The WUR receiver may also communicate the minimum number of group IDs that it can store in its memory to the WUR transceiver. This may be communicated to the WUR transmitter via a management frame, which in some embodiments, may be a WUR action frame. The minimum number of group IDs may be similarly communicated in the group IDs support field of the capabilities information element field.

Type dependent field 303 may comprise control information. Frame body 304 may be a variable length field may comprise information specific to the wake-up packet 300. The length of frame body 304 is indicated in frame control field 301. FCS field 305 may comprise a cyclic redundancy check (CRC) calculated based on frame control 301, address 302, type dependent 303, and frame body 304.

Figure 4:
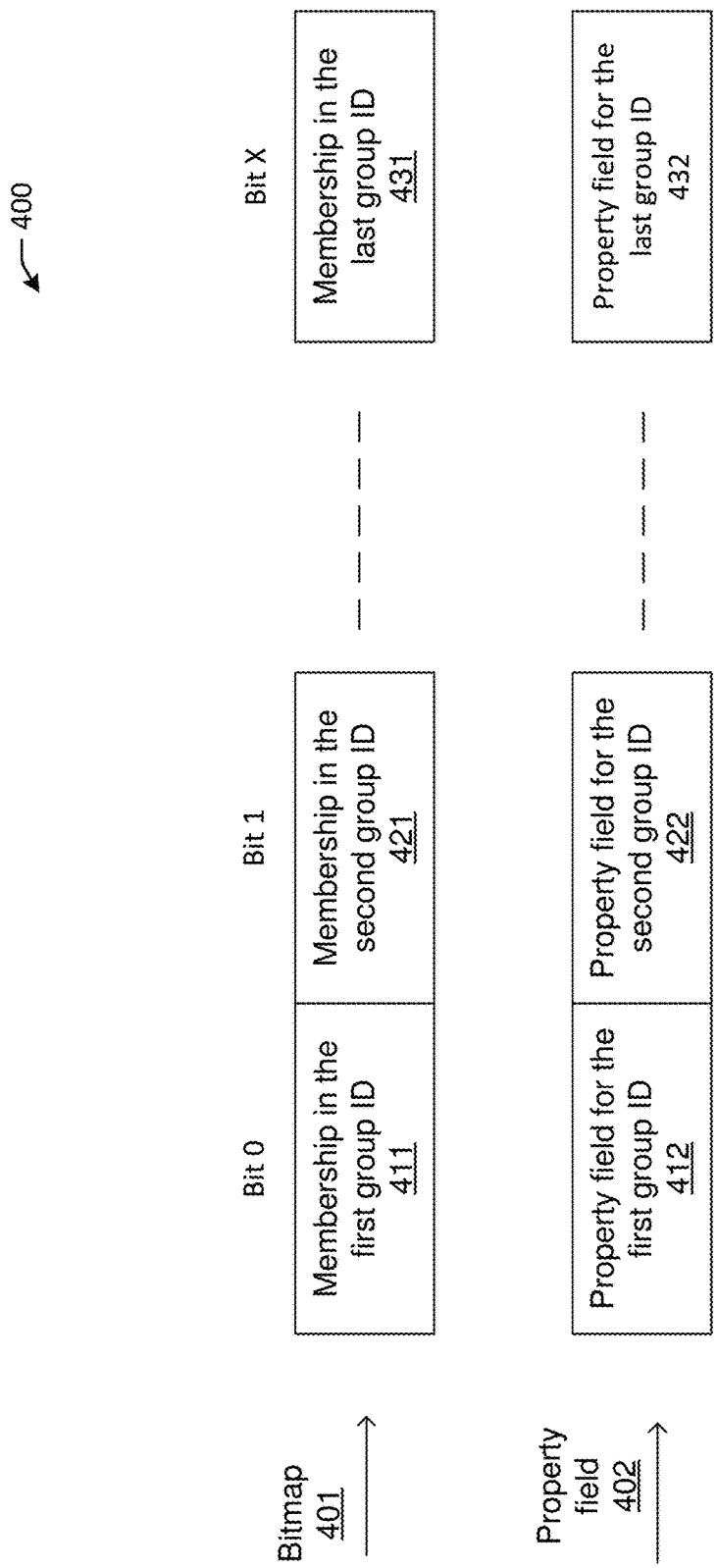
FIG. 4 depicts an illustrative schematic diagram for group ID indication signaling, in accordance with one or more example embodiments of the present disclosure.

FIG. 4 depicts an illustrative schematic diagram 400 for group ID indication signaling, in accordance with one or more example embodiments of the present disclosure.

The group ID that a WUR receiver is assigned to may be communicated to the WUR receiver in a management frame. In some embodiments, the management frame may be an action frame. The group ID may be included in a capability element field of the action frame. the following two options may be considered. For example, bitmap 401 may comprise X bits, and each bit may designate that the WUR receiver is assigned to a group associated with the group ID corresponding the bit. For instance, a WUR receiver in user device 126, may receive bitmap 401 in an action frame, where bitmap 401 comprises five bits (e.g., bits 0, 1, 2, 3, and 4), where bit 0, bit 2, and bit 4 have a value of 1, and the remaining bits (e.g., bits 1 and 3) have a value of 0. This designation indicates that the WUR receiver is assigned membership in the first group ID, membership in the third group ID, and membership in the last group ID. The bitmap 401 may comprise membership in the first group ID 411, membership in the second group ID 421 . . . membership in the last group ID 431. In some embodiments, membership in the first group ID may have a value of 0. In some embodiments, the membership in the first group ID may be the same value for all WUR receivers that the WUR transmitter transmits wake-up frames to. The size of the bitmap 401 may also be transmitted, by the WUR transmitter to the WUR receiver, in the capability element. The size of the bitmap 401 may be equal to the number of bits in the bitmap 401.

In one embodiment, for each group ID assigned to a WUR receiver, a property field may be associated with the group ID to convey an additional meaning of the group ID to the WUR receiver. More specifically, for each membership in the group ID (e.g., membership in the second group ID), there may be a corresponding property field for that group ID (property field for the second group ID). That is, the property field 402 may comprise one or more subfields, each of which corresponds to a group ID, indicating information particular each of the group IDs. The property field 402 may comprise a property field for the first group ID 412, a property field for the second group ID 422, a property field for the last group ID 432, as well as a property field for any other group ID between the second group ID 422 an the last group ID 432.

One of the subfields in the property field 402, may include information that the wake-up frame 300 will be authenticated, or that the wake-up frame 300 will not be authenticated. In some embodiments, there may be a bit in the property field 402 that may indicate that the wake-up frame 300 will be authenticated. The property field 402 may also include a subfield indicating that a Trigger frame transmission will be transmitted from a PCR, in the WUR transmitter, after the WUR receiver wakes up its PCR radio. In some embodiments, there may be a bit in the property field 402 that may be used to indicate that a Trigger frame will be transmitted. The property field 402 may further include a subfield indicating that Group addressed traffic is supported by the PCR in the WUR transmitter. The property field 402 may further include a subfield that may wake up the PCR radio in the WUR receiver. The property field 402 may further still include a subfield that indicates to the WUR receiver that an additional list of group IDs may be transmitted in the frame body field 304 of the wake-up frame 300. The property field 402 may also include a subfield that indicates to the WUR receiver that an update will be included in a beacon frame or simply check beacon frame transmitted by the PCR in the WUR transceiver, and to the PCR in the WUR receiver. The property field 402 may also include a subfield that indicates an update associated with the WUR operating channel. For example, the subfield may indicate a channel that the WUR receiver should tune its WURx to.

Figure 5:
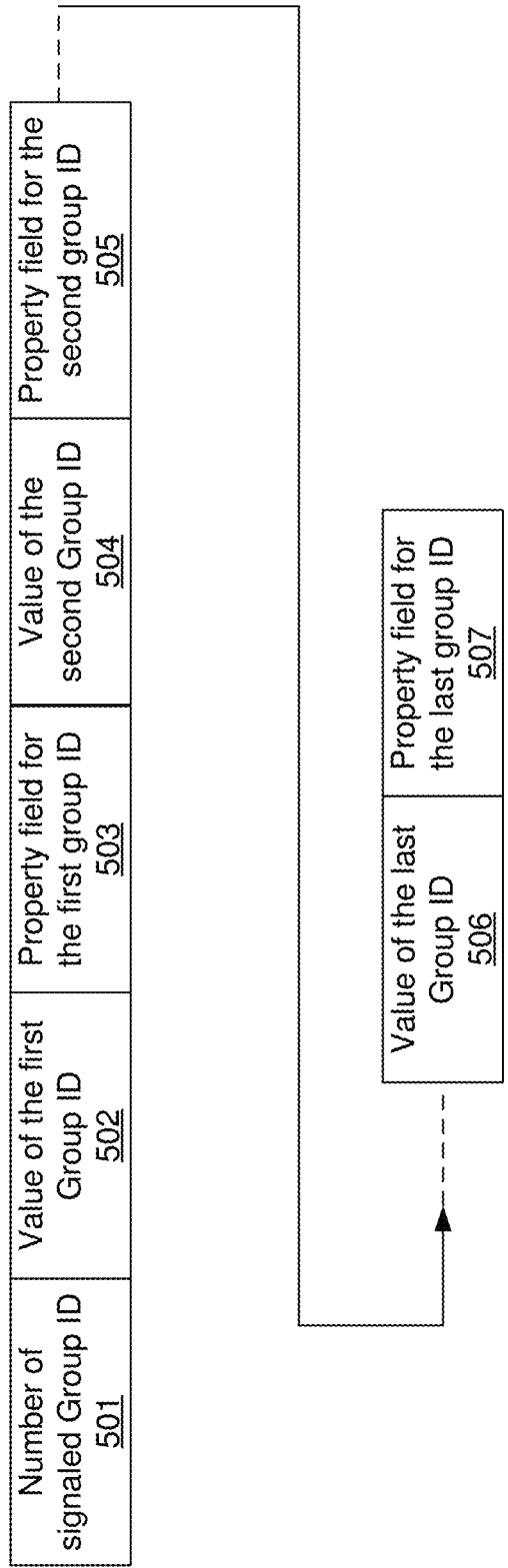
FIG. 5 depicts an illustrative schematic diagram for group ID indication signaling, in accordance with one or more example embodiments of the present disclosure.

FIG. 5 depicts an illustrative schematic diagram 500 for group ID indication signaling, in accordance with one or more example embodiments of the present disclosure.

In some embodiments, the WUR transmitter may transmit, in a capability element, a list of group IDs. For example, the list of group IDs may comprise the number of group IDs being transmitted in the capability element, the value of each of the group IDs, and the property field associated with each of the group IDs. The capability element may be illustrated by schematic diagram 500, and may comprise number of signaled Group ID 501. The number of signaled Group ID 501 may indicate the number of group IDs included in the capability element. The capability element may also comprise value of the first Group ID 502, property field for the first group ID 503, value of the second Group ID 504, property field for the second group ID 505 . . . value of the last Group ID 506, and property field for the last group ID 507. The value of each of the group IDs can either be increasing or decreasing in order.

In some embodiments, the list of group IDs and bitmap of the group IDs may be included in the capability element. For instance, group IDs with certain properties may be signaled in a list of group IDs. In other instances, group IDs with certain properties may be signaled with a bitmap.

Figure 6:
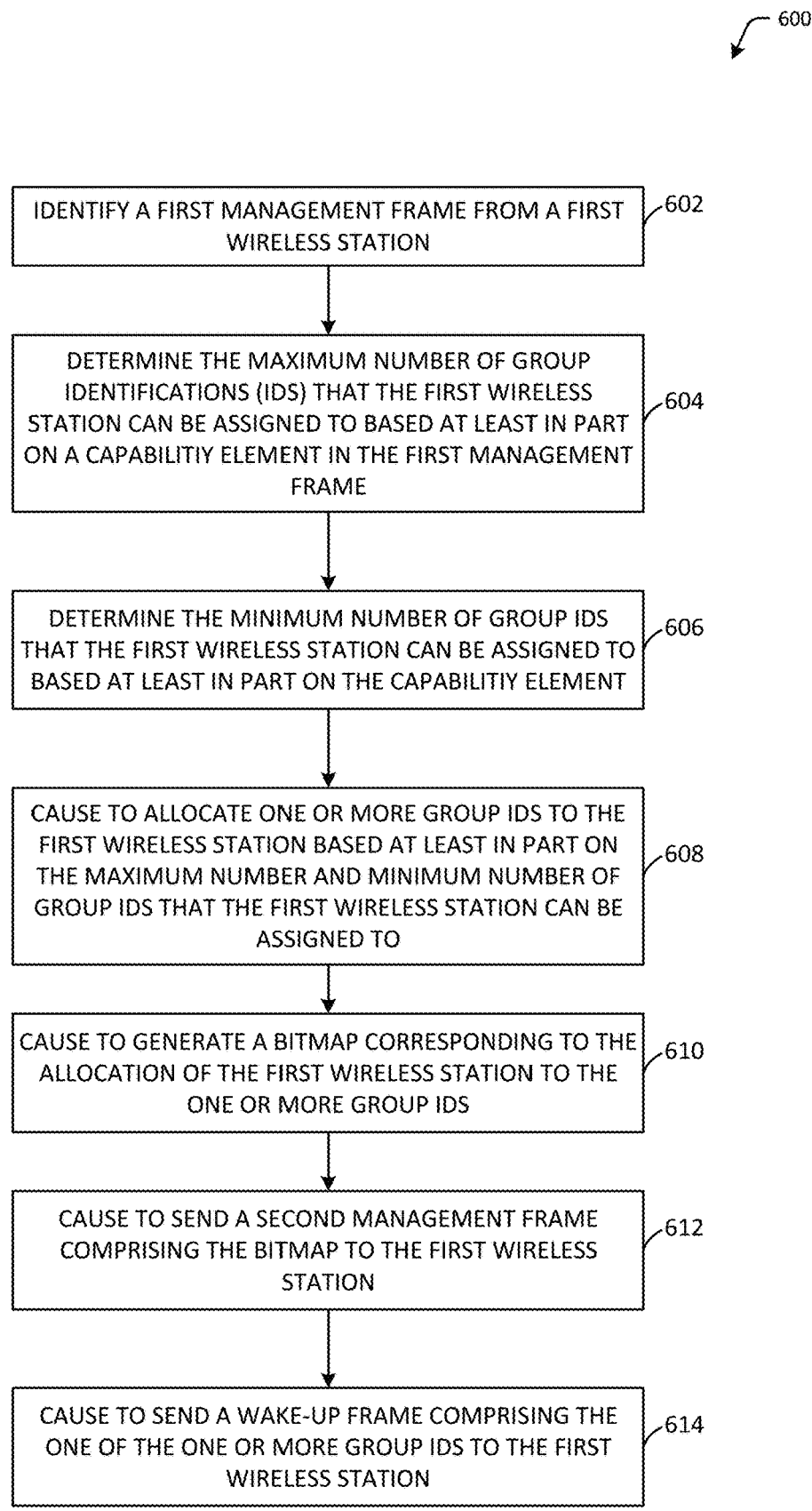
FIG. 6 depicts a flow diagram of illustrative process for group ID indication signaling, in accordance with one or more example embodiments of the present disclosure.

FIG. 6 depicts a flow diagram of illustrative process for group ID indication signaling, in accordance with one or more example embodiments of the present disclosure. While the following description is directed to a method (i.e., method 600) being performed by a wireless station, it is appreciated that the method can be performed in whole or in part by a device other than a wireless station (e.g., by access point (AP) 102).

At block 602, the wireless station may identify a first management frame received from a first wireless station (e.g., user device 126). The management frame may be a 802.11 management frame.

At block 604, the wireless station may determine the maximum number of group identifications (IDs) that the first wireless station can be assigned to based at least in part on a capability element in the first management frame. As explained above, the number of group IDs that a wireless station (non-AP wireless stations) can store is based on the amount of memory the wireless station has available to store group IDs.

At block 606, the wireless station may determine the minimum number of group IDs that the first wireless station can be assigned to based at least in part on the capability element.

At block 608, the wireless station may cause to allocate one or more group IDs to the first wireless station based at least in part on the maximum number of group IDs and the minimum number of group IDs that the first wireless station can be assigned to. For example, if the first wireless station must store at least 2 group IDs, but can store no more than 16 group IDs the wireless station may allocate 8 group IDs to the first wireless station.

At block 610, the wireless station may cause to generate a bitmap corresponding to the allocation of the first wireless station to the one or more group IDs. For instance, the wireless station may generate a bitmap, such as bitmap 401 that has a length of 16. That is, the bitmap may be 2 octets in length, with 16 fields each of which coincides with a group ID represented by a bit. Because the wireless station allocates 8 group IDs to the first wireless station, the bitmap may allocate group IDs corresponding to membership in the $1^{st}$, $3^{rd}$, $5^{th}$, $7^{th}$, $9^{th}$, $11^{th}$, $13^{th}$, and $15^{th}$ group IDs. That is bit 0, bit 2, bit 4, bit 6, bit 8, bit 10, bit 12, and bit 14 may have a value of 0 whereas, bit 1, bit 3, bit 5, bit 7, bit 9, bit 11, bit 13, and bit 15 may have a value of 1. The wireless station may also allocate one or more subfields in a property field, such as property field 402, to the one or more group IDs. Each of the subfields in the property field may correspond to a bit in the bitmap. Returning to the example above, the property field may comprise property subfield for the $1^{st}$, $3^{rd}$, $5^{th}$, $7^{th}$, $9^{th}$, $11^{th}$, $13^{th}$, and $15^{th}$ group IDs. As an example, because the wireless station allocates membership in the $1^{st}$ group ID (e.g., membership in the first group ID 411 of bitmap 401) to the first wireless station, there may be a property subfield for the $1^{st}$ group ID (e.g., property field for the first group ID 412 of property field 402).

At block 612, the wireless station may cause to send a second management frame comprising the bitmap to the first wireless station. In some embodiments, the second management frame may also comprise the property field as well. At block 614 the wireless station may cause to send a wake-up frame comprising the one of the one or more group IDS to the first wireless station.

Figure 7:
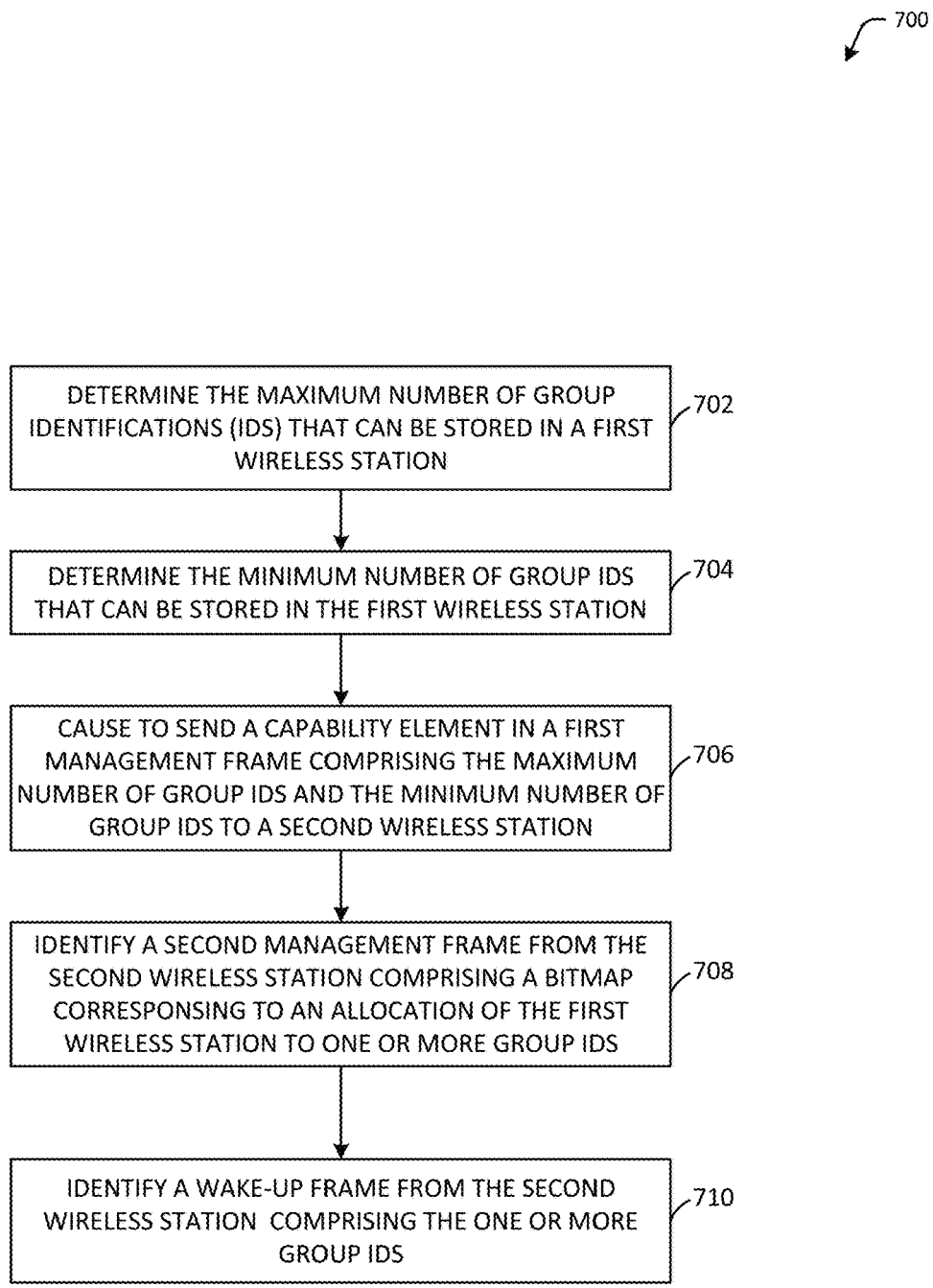
FIG. 7 depicts a flow diagram of illustrative process for group ID indication signaling, in accordance with one or more example embodiments of the present disclosure.

FIG. 7 depicts a flow diagram of illustrative process for group ID indication signaling, in accordance with one or more example embodiments of the present disclosure. While the following description is directed to a method (i.e., method 700) being performed by a first wireless station, it is appreciated that the method can be performed in whole or in part by a device other than the first wireless station (e.g., user device 126).

At block 702, the first wireless station may determine the maximum number of group identifications (IDs) that can be stored in memory. As explained above, a wireless station such as user device 126 may only be able to store a certain number of group IDs in memory so the first wireless station has to communicate this information to the wireless station (e.g., AP 102).

At block 706, the first wireless station may determine the minimum number of group IDs that it can store in memory.

At block 708, the first wireless station may cause to send a capability element in a first management frame comprising the maximum number of group IDs and the minimum number of group IDs to a second wireless station. For example, the first wireless station may be required to store at least 2 group IDs, but can store no more than 16 group IDs. The capability element may be included in a management frame.

At block 708, the first wireless station may identify a second management frame from the second wireless station comprising a bitmap corresponding to an allocation of the first wireless station to one or more group IDs. For instance, the first wireless station may receive a bitmap, such as bitmap 401 that has a length of 16. That is, the bitmap may be 2 octets in length, with 16 fields each of which coincides with a group ID represented by a bit. The bitmap may allocate group IDs corresponding to membership in the $1^{st}$, $3^{rd}$, $5^{th}$, $7^{th}$, $9^{th}$, $11^{th}$, $13^{th}$, and $15^{th}$ group IDs. That is bit 0, bit 2, bit 4, bit 6, bit 8, bit 10, bit 12, and bit 14, in a bitmap such as bitmap 401, may have a value of 0, whereas bit 1, bit 3, bit 5, bit 7, bit 9, bit 11, bit 13, and bit 15 may have a value of 1. The second management frame may also comprise one or more subfields in a property subfield, such as property field 402, associated with the one or more group IDs. Each of the subfields in the property field may correspond to a bit in the bitmap. Returning to the example above, the property field may comprise property subfield for the $1^{st}$, $3^{rd}$, $5^{th}$, $7^{th}$, $9^{th}$, $11^{th}$, $13^{th}$, and $15^{th}$ group IDs. As an example, because the first wireless station is allocated membership in the $1^{st}$ group ID (e.g., membership in the first group ID 411 of bitmap 401), there may be a property subfield for the $1^{st}$ group ID (e.g., property field for the first group ID 412 of property field 402).

At block 710, the first wireless station may identify a wake-up frame from the second wireless station comprising the one or more group IDs. The first wireless station may cause a PCR in the first wireless station to turn on after it receives the wake-up frame.

Figure 8:
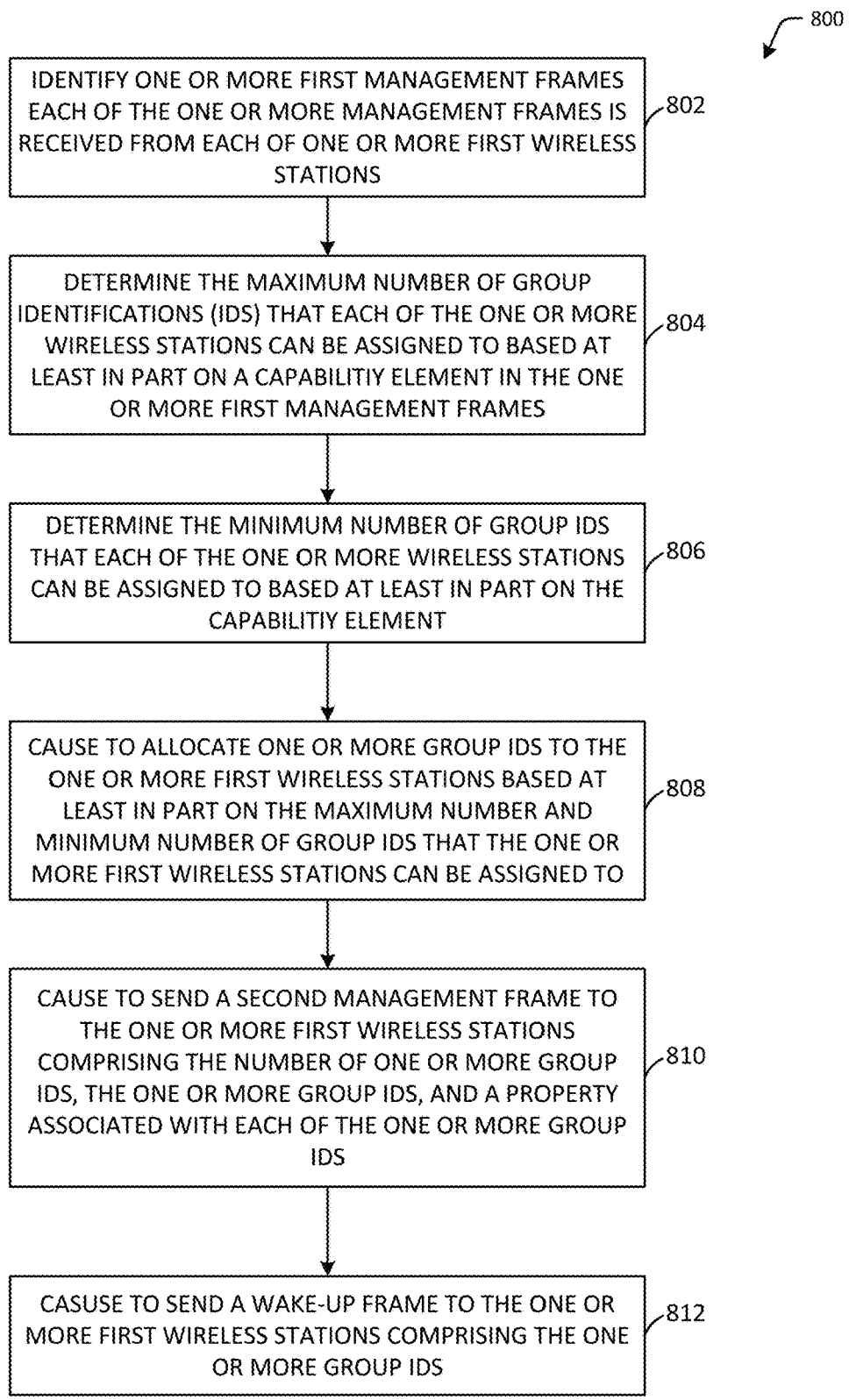
FIG. 8 depicts a flow diagram of illustrative process for group ID indication signaling, in accordance with one or more example embodiments of the present disclosure.

FIG. 8 depicts a flow diagram of illustrative process for group ID indication signaling, in accordance with one or more example embodiments of the present disclosure. While the following description is directed to a method (i.e., method 800) being performed by a wireless station, it is appreciated that the method can be performed in whole or in part by a device other than a wireless station (e.g., by access point (AP) 102).

At block 802, the wireless station may identify one or more first management frames, wherein each of the one or more management frames is received from each of one or more first wireless stations. (e.g., user devices 120). The first management frame may be a 802.11 management frame.

At block 804, the wireless station may determine the maximum number of group identifications (IDs) that each of the one or more first wireless stations can be assigned to based at least in part on a capability element in the one or more first management frames. As explained above, the number of group IDs that a wireless station (non-AP wireless stations) can store is based on the amount of memory the wireless station has available to store group IDs.

At block 806, the wireless station may determine the minimum number of group IDs that each of the one or more first wireless stations can be assigned to based at least in part on the capability element.

At block 808, the wireless station may cause to allocate one or more group IDs to the one or more first wireless stations based at least in part on the maximum number of group IDs and the minimum number of group IDs that the one or more first wireless stations can be assigned to. For example, there may be a first wireless station, of the one or more wireless stations, that must store at least 2 group IDs, but can store no more than 16 group IDs the wireless station may allocate 8 group IDs to the first wireless station. And there may be a second wireless station, of the one or more wireless stations, that must store at least 4 group IDS, but can store more than 32. Accordingly, 8 group IDs may be allocated to the first wireless station of the one or more wireless stations, and 16 group IDs may be allocated to the second wireless station of the one or more wireless stations.

At block 810, the wireless station may cause to send a second management frame to the one or more first wireless stations comprising the number of one or more group IDs, the one or more group IDs, and a property associated with each of the one or more group IDs. The number of one or more group IDs, the one or more group IDs, and a property associated with each of the one or more group IDs may be included in a capability element in the second management field. The capability element may comprise one or more fields such as those in schematic diagram 500. For instance, the number of one or more group IDs may be included in number of signaled Group ID 501. The first group ID of the one or more group IDs may be recorded in value of the Group ID 502. The second group ID of the one or more group IDs may be recorded in value of the second Group ID 504. The last group ID of the one or more group IDs may be recorded in value of the last Group ID 506. The property associated with the first group ID may be recorded in property field for the first group ID 503. The property associated with the second group ID may be recorded in the property field for the second group ID 505. The property associated with the last group ID may be recorded in the property field for the last group ID 507. After the wireless stations transmits the second management frame, the wireless station may cause to send a wake-up frame to the one or more first wireless stations comprising the one or more group IDs at step 812.

Figure 9A:
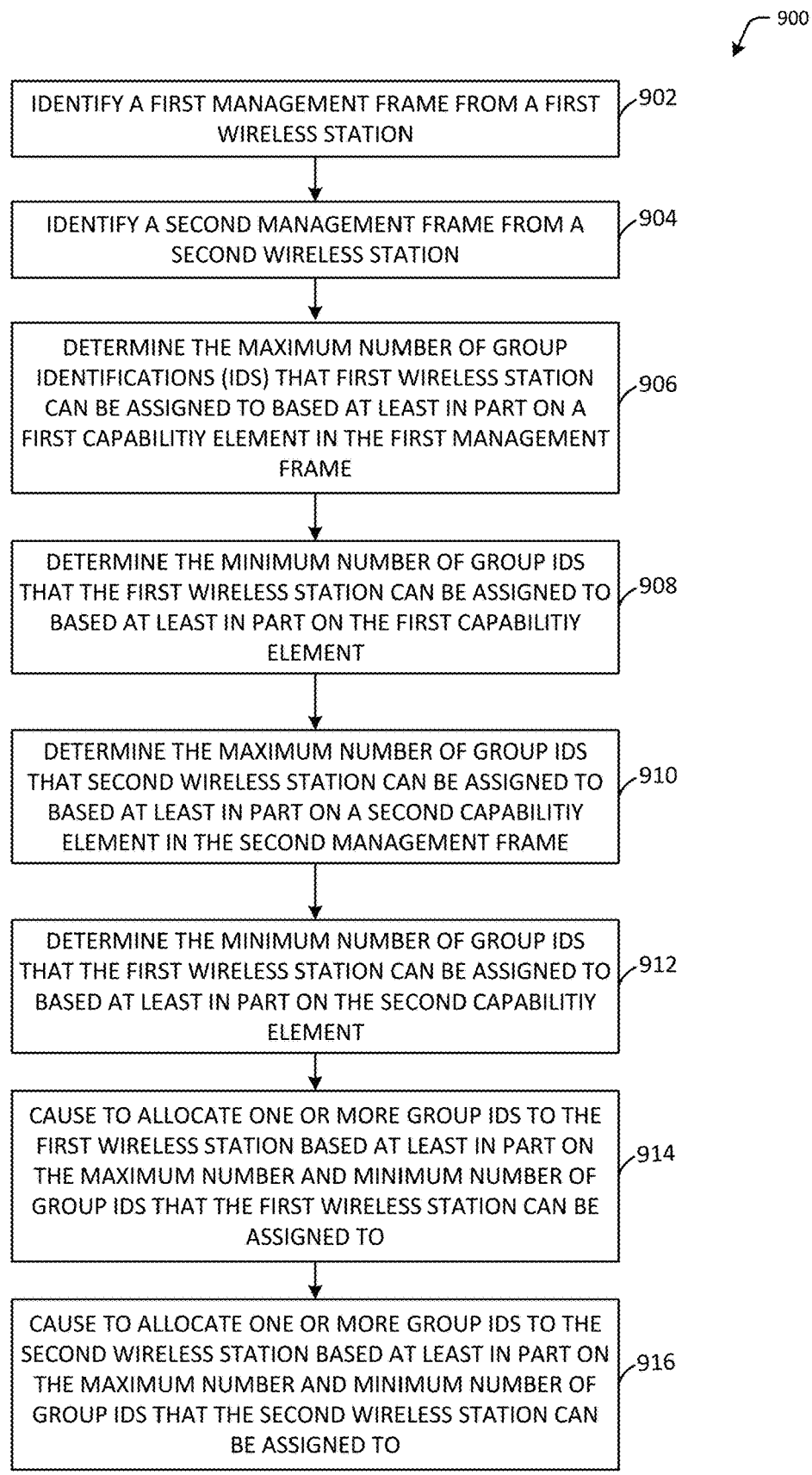
FIG. 9A depicts a flow diagram of illustrative process for group ID indication signaling, in accordance with one or more example embodiments of the present disclosure.
Figure 9B:
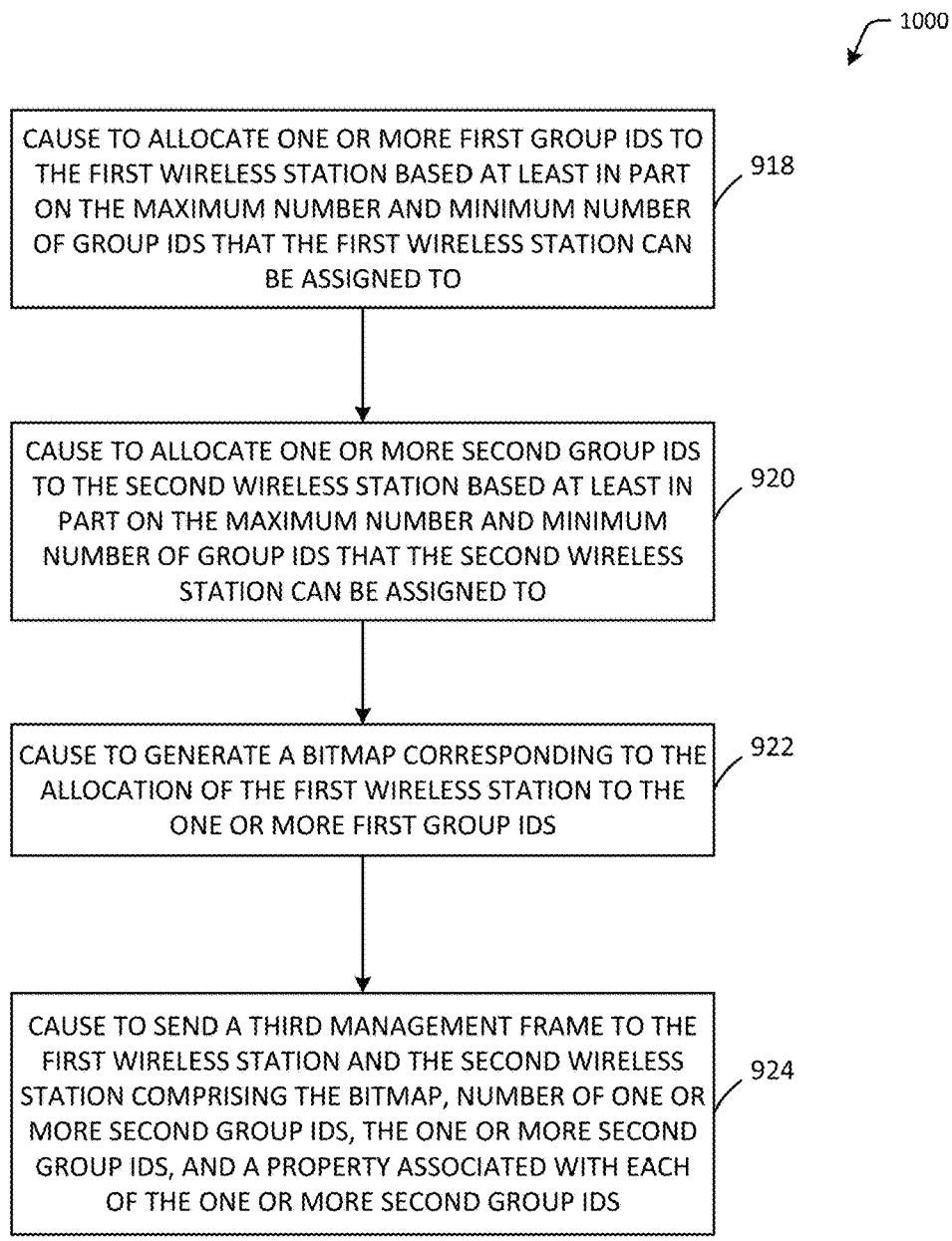
FIG. 9B depicts a flow diagram of illustrative process for group ID indication signaling, in accordance with one or more example embodiments of the present disclosure.

FIG. 9A depicts a flow diagram of illustrative process for group ID indication signaling, in accordance with one or more example embodiments of the present disclosure. While the following description is directed to a method (i.e., method 900) being performed by a wireless station, it is appreciated that the method can be performed in whole or in part by a device other than a wireless station (e.g., by access point (AP) 102).

At block 902, the wireless station may identify a first management frame received from a first wireless station (e.g., user device 126).

At block 904, the wireless station may identify a second management frame received from a second wireless station.

At block 906, the wireless station may determine the maximum number of group identifications (IDs) that the first wireless station can be assigned to based at least in part on a first capability element in the first management frame.

At block 908, the wireless station may determine the minimum number of group IDs that the first wireless station can be assigned to based at least in part on the first capability element.

At block 910, the wireless station may determine the maximum number of group IDs that the second wireless station can be assigned to based at least in part on a second capability element in the second management frame. At block 912, the wireless station may determine the minimum number of group IDs that the second wireless station can be assigned to based at least in part on the second capability element.

At block 914, the wireless station may cause to allocate one or more group IDs to the first wireless station based at least in part on the maximum number and minimum number of group IDs that the first wireless station can be assigned to. At block 916, the wireless station may cause to allocate one or more group IDs to the second wireless station based at least in part on the maximum number and the minimum number of group IDs that the second wireless station can be assigned to.

At block 918, the wireless station may cause to allocate one or more first group IDs to the first wireless station based at least in part on the maximum number and the minimum number of group IDs that the first wireless station can be assigned to. At block 920, the wireless station may cause to allocate one or more second group IDs to the second wireless station based at least in part on the maximum number and the minimum number of group IDs that the second wireless station can be assigned to.

At block 922, the wireless station may cause to generate a bitmap corresponding to the allocation of the first wireless station to the one or more first group IDs. At block 924, the wireless station may cause to send a third management frame to the first wireless station and the second wireless station comprising the bitmap, number of one or more second group IDs, the one or more second group IDs, and a property associated with each of the one or more second group IDs. The bitmap, number of one or more second group IDs, the one or more second group IDs, and the property associated with each of the one or more second group IDs may be included in a capability element in the third management frame.

FIG. 10 shows a functional diagram of an exemplary communication station 1000 in accordance with some embodiments. In one embodiment, FIG. 10 illustrates a functional block diagram of a communication station that may be suitable for use as an AP 102 (FIG. 1) or a user device 120 (FIG. 1) in accordance with some embodiments. The communication station 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1000 may include communications circuitry 1002 and a transceiver 1010 for transmitting and receiving signals to and from other communication stations using one or more antennas 1001. The transceiver 1010 may be a device comprising both a transmitter and a receiver that are combined and share common circuitry (e.g., communication circuitry 1002). The communication circuitry 1002 may include amplifiers, filters, mixers, analog to digital and/or digital to analog converters. The transceiver 1010 may transmit and receive analog or digital signals. The transceiver 1010 may allow reception of signals during transmission periods. This mode is known as full-duplex, and may require the transmitter and receiver to operate on different frequencies to minimize interference between the transmitted signal and the received signal. The transceiver 1010 may operate in a half-duplex mode, where the transceiver 1010 may transmit or receive signals in one direction at a time.

The communications circuitry 1002 may include circuitry that can operate the physical layer (PHY) communications and/or media access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in FIGS. 1-9B.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device memory.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), a group ID indication signaling device 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The group ID indication signaling device 1119 may carry out or perform any of the operations and processes (e.g., process 600) described and shown above.

It is understood that the above are only a subset of what the group ID indication signaling device 1119 may be configured to perform and that other functions included throughout this disclosure may also be performed by the group ID indication signaling device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device comprising memory and processing circuitry configured to: identify a first management frame from a first wireless station; cause to allocate one or more group identifications (IDs) to the first wireless station; cause to generate a bitmap corresponding to the allocation of the one or more group IDs to the first wireless station; and cause to send a second management frame to the first wireless station of one or more wireless stations, wherein the second management frame comprises the bitmap.

Example 2 may include the device of example 1 and/or some other example herein, wherein the first management frame comprises a capability element associated with the first wireless station.

Example 3 may include the device of example 2 and/or some other example herein, wherein the capability element comprises a maximum number of group IDs that the first wireless station stores.

Example 4 may include the device of example 2 and/or some other example herein, wherein the capability element comprises a minimum number of group IDs that the first wireless station stores.

Example 5 may include the device of example 3 and/or some other example herein, wherein the memory and the processing circuitry are further configured to allocate the one or more group IDs to the first wireless station based at least in part on the maximum number of group IDs that the first wireless station stores.

Example 6 may include the device of example 4 and/or some other example herein, wherein the memory and the processing circuitry are further configured to allocate the one or more group IDs to the first wireless station based at least in part on the minimum number of group IDs that the first wireless station stores.

Example 7 may include the device of claim 1 and/or some other example herein, wherein a size of the bitmap corresponds to the number of bits in the bitmap.

Example 8 may include the device of example 1 and/or some other example herein, wherein the second management frame comprises the group IDs indicated by a first bit of the bitmap.

Example 9 may include the device of example 1 and/or some other example herein, wherein the device further comprises a transceiver configured to transmit and receive wireless signals.

Example 10 may include the device of example 9 and/or some other example herein, wherein the device further comprises one or more antennas coupled to the transceiver.

Example 11 may include a non-transitory computer-readable medium storing computer-executable instructions which, when executed by a processor, cause the processor to perform operations comprising: determine the maximum number of group identifications (IDs) that can be stored in the non-transitory computer-readable medium; determine the minimum number of group IDs to be stored in the non-transitory computer-readable medium; cause to send a first management frame comprising the maximum number of group IDs and the minimum number of group IDs to a wireless station; identify a second management frame from the wireless station comprising a bitmap corresponding to an allocation of the first wireless station to one or more group IDs; and identify a wake-up frame from the wireless station comprising the one or more group IDs.

Example 12 may include the non-transitory computer-readable medium of example 11 and/or some other example herein, wherein the first management frame comprises a capability element.

Example 13 may include the non-transitory computer-readable medium of example 12 and/or some other example herein, wherein the capability element comprises the maximum number of group IDs.

Example 14 may include the non-transitory computer-readable medium of example 12 and/or some other example herein, wherein the capability element comprises the minimum number of group IDs.

Example 15 may include the non-transitory computer-readable medium of example 11 and/or some other example herein, wherein a size of the bitmap corresponds to the number of bits in the bitmap.

Example 16 may include the non-transitory computer-readable medium of example 11 and/or some other example herein, wherein each bit in the bitmap indicates a membership of a low-power wake-up radio receiver in a group ID of the one or more group IDs.

Example 17 may include the non-transitory computer-readable medium of example 11 and/or some other example herein, wherein the management frame comprises a medium access control (MAC) field, a frame body, and frame check sequence (FCS) field.

Example 18 may include the non-transitory computer-readable medium of example 17 and/or some other example herein, wherein the MAC field comprises a frame control field, address field, and type dependent field.

Example 19 may include the non-transitory computer-readable medium of example 17 and/or some other example herein, wherein the address field comprises the one or more group IDs.

Example 20 may be a method comprising: identifying a first management frame from a first wireless station; causing to allocate one or more group identifications (IDs) to the first wireless station; causing to generate a bitmap corresponding to the allocation of the one or more group IDs to the first wireless station; and causing to send a second management frame to the first wireless station of one or more wireless stations, wherein the second management frame comprises the bitmap.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   identify a first management frame from a first wireless station, wherein the first management frame comprises a capability element associated with the first wireless station, wherein the capability element comprises a minimum number of group IDs that the first wireless station stores;
   allocate one or more group identifications (IDs) to the first wireless station;
   generate a bitmap corresponding to the allocation of the one or more group IDs to the first wireless station; and send a second management frame to the first wireless station of one or more wireless stations, wherein the second management frame comprises the bitmap.

2. The device of claim 1, wherein the capability element comprises a maximum number of group IDs that the first wireless station stores.

3. The device of claim 2, wherein the memory and the processing circuitry are further configured to allocate the one or more group IDs to the first wireless station based at least in part on the maximum number of group IDs that the first wireless station stores.

4. The device of claim 1, wherein the memory and the processing circuitry are further configured to allocate the one or more group IDs to the first wireless station based at least in part on the minimum number of group IDs that the first wireless station stores.

5. The device of claim 1, wherein a size of the bitmap corresponds to the number of bits in the bitmap.

6. The device of claim 1, wherein the second management frame comprises the group IDs indicated by a first bit of the bitmap.

7. The device of claim 1, further comprising a transceiver configured to transmit and receive wireless signals.

8. The device of claim 7, further comprising one or more antennas coupled to the transceiver.

9. A method comprising:
identifying a first management frame from a first wireless station, wherein the first management frame comprises a capability element associated with the first wireless station, wherein the capability element comprises a minimum number of group IDs that the first wireless station stores;

allocating one or more group identifications (IDs) to the first wireless station;

generating a bitmap corresponding to the allocation of the one or more group IDs to the first wireless station; and sending a second management frame to the first wireless station of one or more wireless stations, wherein the second management frame comprises the bitmap.

\* \* \* \* \*